A. KLOTZBACH.
BALL CASTER.
APPLICATION FILED MAY 29, 1908.

899,013.

Patented Sept. 15, 1908.

Witnesses

Inventor
Augustus Klotzbach
By Geo. E. Tew
Attorney

UNITED STATES PATENT OFFICE.

AUGUSTUS KLOTZBACH, OF CLEVELAND, OHIO.

BALL-CASTER.

No. 899,013.            Specification of Letters Patent.        Patented Sept. 15, 1908.

Application filed May 29, 1908. Serial No. 435,731.

To all whom it may concern:

Be it known that I, AUGUSTUS KLOTZBACH, citizen of the United States, residing at Cleveland, in the county of Cuyahoga and State of Ohio, have invented certain new and useful Improvements in Ball - Casters, of which the following is a specification.

This invention relates to that class of ball-casters which are provided with anti-friction rollers; and the object of the present invention is to provide a caster of this kind which is simple in structure, and which can be readily applied to the leg of a table or other piece of furniture, it having but a few parts which can be readily assembled.

Figure 1:
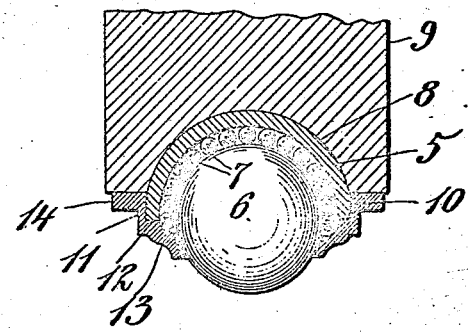
Figure 2:
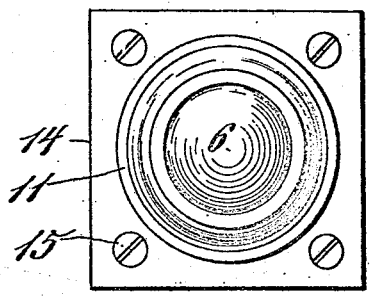

In the accompanying drawings, Figure 1 is a sectional view showing the application of the invention. Fig. 2 is a bottom plan view.

Referring specifically to the drawings, 5 denotes a semi-spherical cup or shell which contains a large caster-ball 6, and anti-friction balls or rollers 7, the latter being interposed between the ball 6 and the interior surface of the cup.

The cup is let into a socket 8 made in the bottom of the leg 9 or other part to which the caster is applied, and it projects a short distance therefrom, said projecting end of the cup being exteriorly screw-threaded, as indicated at 10. On this threaded portion of the cup is screwed a ring 11 for holding the balls in place. The ring has a shoulder 12 which comes up squarely against the bottom of the cup, and below the latter the ring has a shoulder 13 to support the balls 7. Below the last mentioned shoulder the inside diameter of the ring is such that the ball 6 may protrude therefrom a suitable distance. The ring also has a flange 14 whereby it is attached to the leg 9 by means of screws or other suitable fastening means 15 passing through holes in the flange.

By the construction herein described a caster is had which is strong and durable, and simple in construction. The parts can be quickly assembled and adjusted, and the caster can be readily applied. By having the attaching flange on the retaining ring the structure is simplified and the number of parts is reduced. The balls 7 cover the entire surface of that portion of the ball 6 which is located within the cup, and friction is therefore reduced to a minimum, and the table or other piece of furniture can be easily moved in any direction.

I claim:

In a caster, the combination with a cup adapted to fit in a socket in the part to which the caster is applied and project at its edge therefrom, the projecting edge of the cup being externally screw-threaded, a ball in the cup, anti-friction rollers interposed between said ball and the inner surface of the cup, a retaining ring screwed on the threaded edge of the cup into contact with the said part and having a lower shoulder to support the rollers, and an opening through which the ball protrudes, and an upper attaching flange on the ring, said flange projecting beyond the periphery of the cup and being adapted for fastening to the said part, and the ring serving to retain the cup in the said part and to retain the balls in the cup.

In testimony whereof I affix my signature, in presence of two witnesses.

AUGUSTUS KLOTZBACH.

Witnesses:
MONROE E. MILLER,
JOHN A. BOMMHARDT